United States Patent [19]

Fitch

[11] 4,017,402

[45] Apr. 12, 1977

[54] SEDIMENTATION TANK HAVING A ROTARY RAKE STRUCTURE

[75] Inventor: Elliot Bryant Fitch, Weston, Conn.

[73] Assignee: Dorr-Oliver Incorporated, Stamford, Conn.

[22] Filed: July 7, 1975

[21] Appl. No.: 594,373

Related U.S. Application Data

[63] Continuation of Ser. No. 496,386, Aug. 12, 1974, abandoned.

[52] U.S. Cl. .............................................. 210/528
[51] Int. Cl.² ........................................ B01D 23/18
[58] Field of Search .......... 210/523, 525, 526, 527, 210/528, 530, 531

[56] References Cited

UNITED STATES PATENTS

| | | | |
|---|---|---|---|
| 1,879,680 | 9/1932 | Hartley et al. | 210/528 X |
| 2,006,825 | 7/1935 | Downes | 210/527 X |
| 2,563,622 | 8/1951 | Scott | 210/531 |
| 2,779,471 | 1/1957 | Knapp | 210/527 X |
| 2,980,934 | 4/1961 | Steindorf | 210/523 X |
| 3,494,462 | 2/1970 | Baud | 210/528 X |
| 3,498,467 | 3/1970 | Hollebrandt | 210/527 |
| 3,498,468 | 3/1970 | Raynor | 210/528 X |
| 3,539,051 | 11/1970 | Stone | 210/528 |
| 3,628,670 | 12/1971 | McGuire | 210/528 |
| 3,807,560 | 4/1974 | Penz et al. | 210/527 |

Primary Examiner—Theodore A. Granger
Attorney, Agent, or Firm—Theodore M. Jablon; Burtsell J. Kearns

[57] ABSTRACT

A continuously operating Sedimentation Tank having a Rotary Rake Structure equipped with sludge engaging blade means constructed and arranged so as to induce thin sludge or supernatant from an upper or superjacent zone to enter the bottom zone of a bed of packed sludge solids, thereby reducing friction between the mass being moved by the blades and a layer underneath of residual material on the tank bottom, thereby reducing the torque requirement of the rake structure for moving the sludge.

16 Claims, 25 Drawing Figures

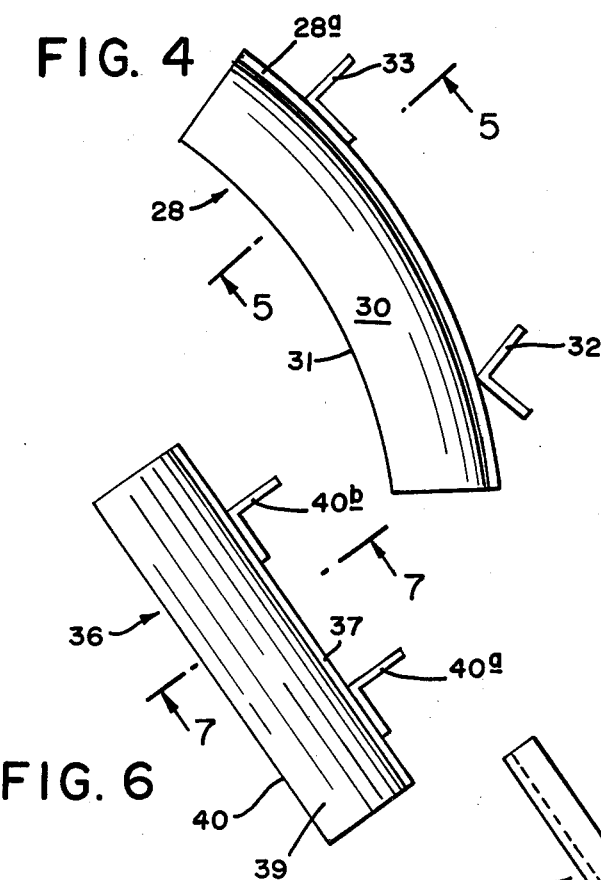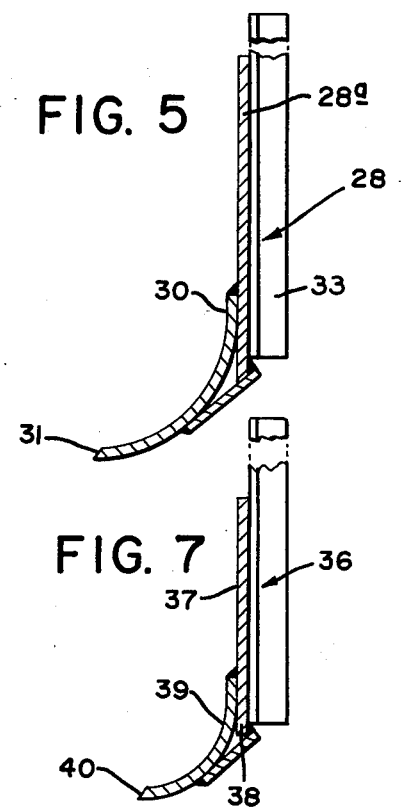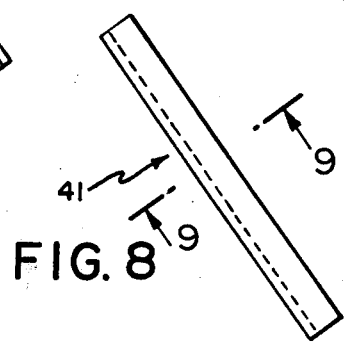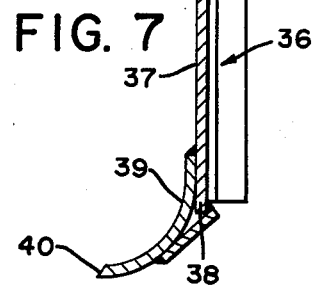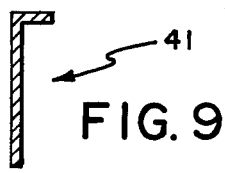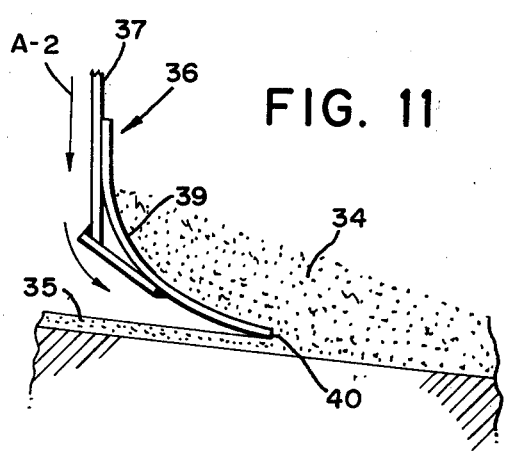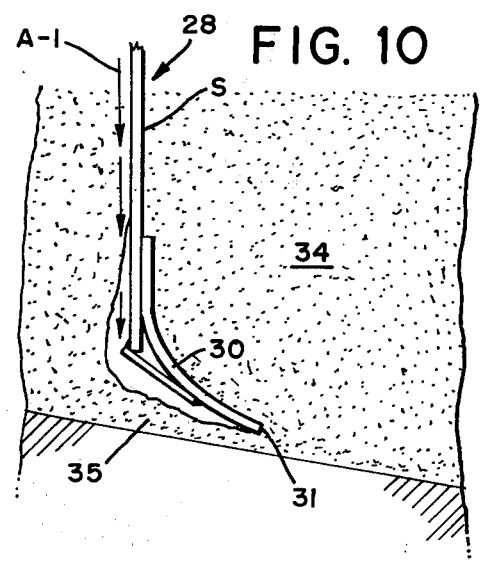

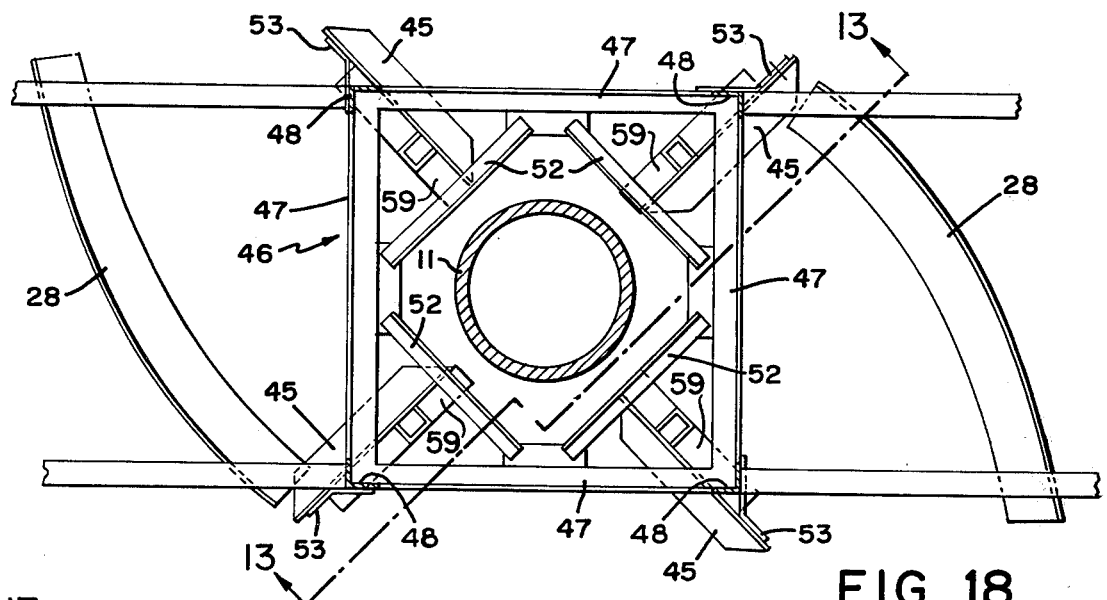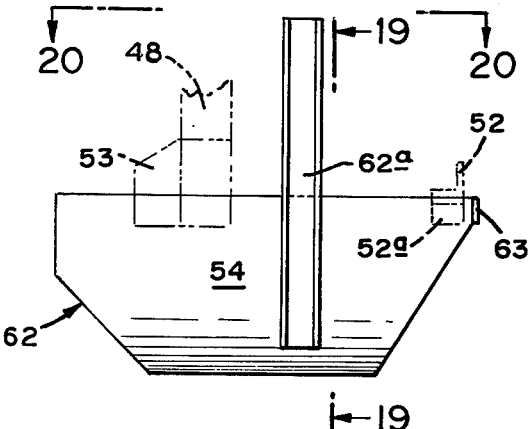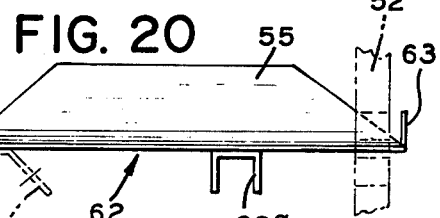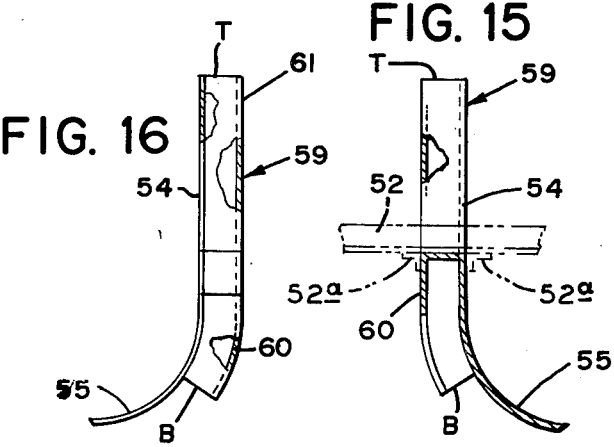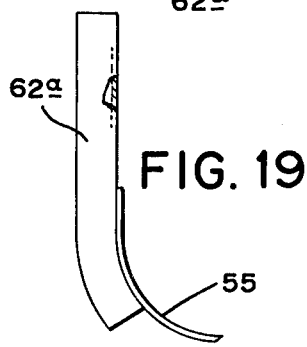

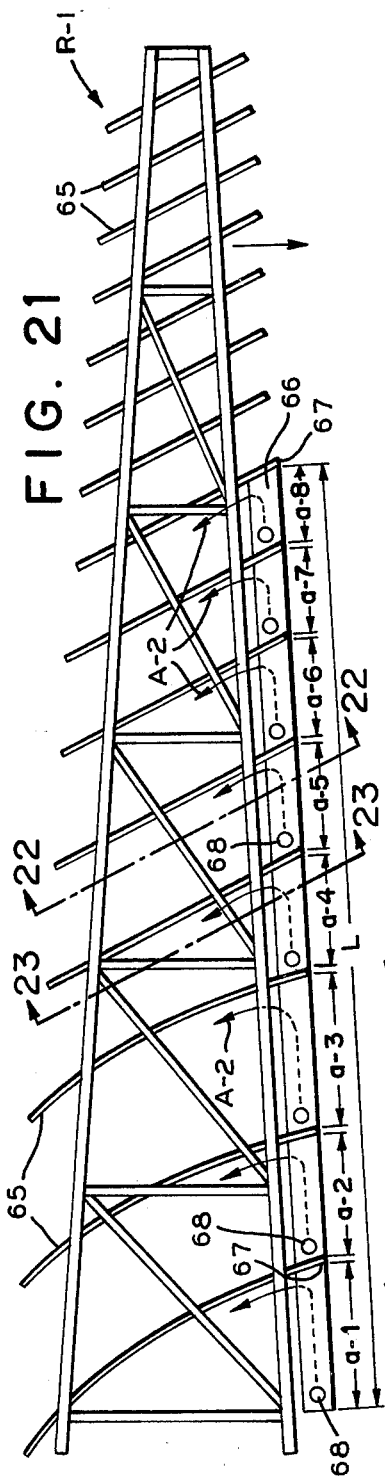
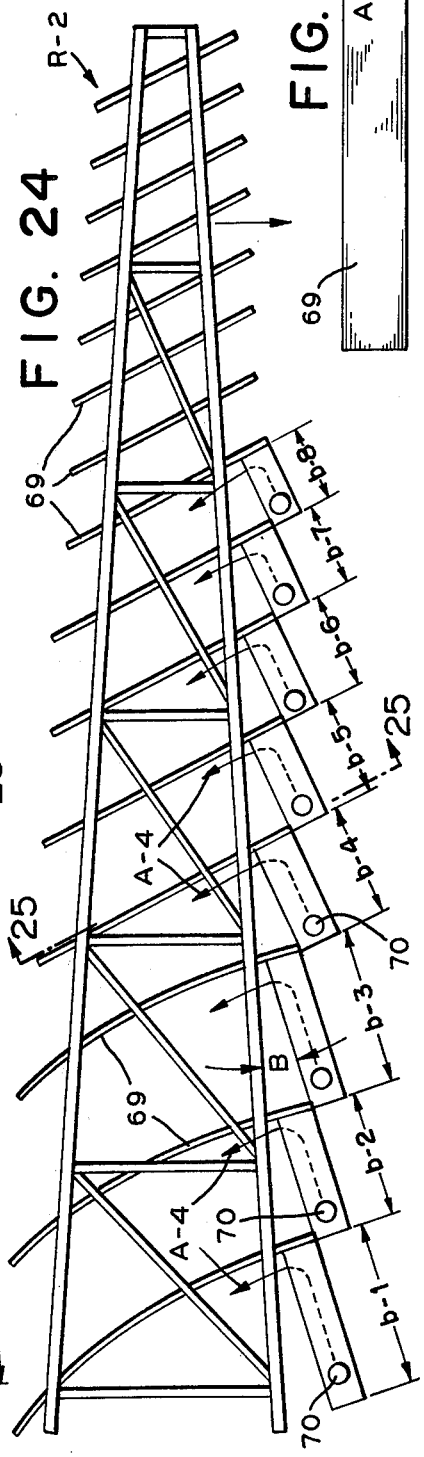
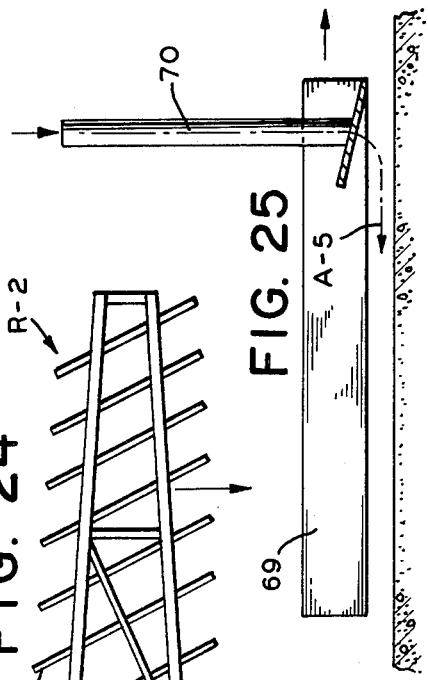
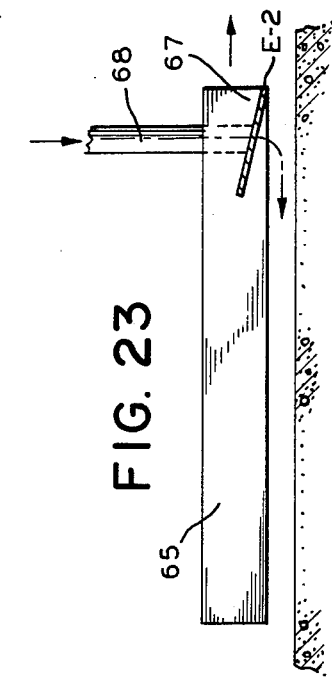
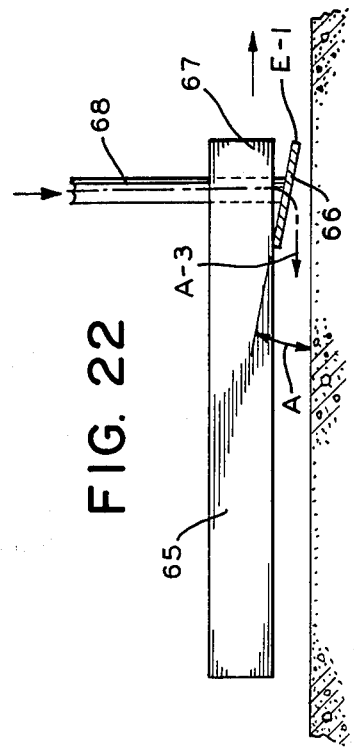

SEDIMENTATION TANK HAVING A ROTARY RAKE STRUCTURE

This is a continuation of application Ser. No. 496,386, filed Aug. 12, 1974, now abandoned.

This invention relates to sedimentation tanks or thickeners receiving a continuous supply of a feed pulp or feed suspension. Such tanks are equipped with a rotary rake structure for continuously moving the settled feed solids in the form of sludge to a central collecting zone for withdrawal through a bottom outlet of the tank, while the separated or supernatant liquid may overflow along the periphery of the tank.

By way of example, the invention is herein embodied in a settling tank wherein the rotary rake structure comprises rake arms which may be of the girder type, extending rigidly from a central vertical cage portion supported for rotation upon the top end of a center pier or column. Fixed to the underside of each rake arm are raking blades effective to convey the sludge over the tank bottom to the annular sump surrounding the foot end of the pier, incident to rotation of the rake structure by driven mechanism mounted atop the pier. A discharge conduit and pump means are provided for the withdrawal of the sludge from the sump. The commercial size of such settling tanks may be in the order 200 to 300 feet diameter, and even considerably larger.

For thickeners of large diameter, the torque required for moving the sludge may become very large which calls for a rake structure and drive gear mechanism of massive and expensive design. Therefore, a reduction in the driving torque requirement for a given sludge condition assumes practical and economical significance, in that it reduces the cost of the mechanism and of the power to operate the same.

It is therefore a main object of this invention to provide means whereby the torque requirements, especially for moving heavy sludge are reducible significantly, reliably, and economically.

The problem underlying this invention may be further analyzed as follows:

In what heretofore has been considered normal practice, the sludge solids are shoved to the center of the thickener by the rotation of the rake structure. This transportation or conveyance of the sludge is due to the action of the raking blades normally constructed so as to extend vertical to the plane or tank bottom over which the settled solids are raked, the blades being set at an angle to their direction of travel so that they scrape the settled solids in the general direction of the central discharge point or zone.

That is to say, the solids are shoved by the vertical planes of the blades in a direction which has tangential and radial components, the radial component being directed towards the center, the tangential component being directed tangential to the circular path of movement of the blades. Only the radial component is useful in effecting the conveyance of the settled solids to the central discharge point.

The tangential component in turn is smaller than the velocity of the blades themselves, with settled solids slipping past the sludge engaging surface of the blades.

Since the settled solids must be shoved or skidded incident to the sludge raking operation, the force or torque required is dependent upon the frictional resistance of the sludge to being moved or shoved relative to the residual layer of solids on the tank bottom.

However, the frictional resistance of particles of a sludge bed submerged in a liquid is affected by several factors. One such is the property of "dilatancy" of certain non-flocculated sludges. The solids in these sludges settle into a closely packed state wherein they are inhibited by the interlocking condition of their shapes from moving past one another. In order to cause them to slip past one another, or to become flowable, the solids must become less closely packed. This means that the void fraction in the sludge must increase. That is to say sludge must be caused to "dilate" by somehow having fluid penetrate into the area of slip or flow.

In order to move a mass of this material, by the raking blades it is herein contemplated that a fluid or water be caused to enter the area of the interface between the mass to be moved and the supporting material, that is a zone of slip or shear.

When the sludge solids are relatively small or fine to begin with, and particularly if there is in the sludge bed a gradation of unflocculated fines down to a very small size, the large particle voids are filled with smaller particles. Consequently, the resulting void crevices or voids are of very small or capillary dimensions which offer a high hydraulic resistance to movement of water through them. Therefore, of fluid must penetrate a substantial layer of settled sludge solids to reach the aforementioned area of slip or shear the sludge will exhibit a correspondingly high resistance to such slip or flow. Under such conditions, settled sludge solids impose a high torque load upon the rake structure and its drive mechanism.

One way to alleviate or to eliminate such dilatant behavior is to flocculate the solids. In the flocculated state the particles cohere into, or are trapped in a structure having increased void space between the particles. They do not settle to the aforementioned closely packed consistency, and hence are less resistant to flow than when not flocculated. Solids can be flocculated by the addition of various flocculating agents. Consequently, one remedy or compromise measure to cope with the high flow resistance of a dilatant pulp, heretofore consisted of the liberal addition to the feed pulp of a flocculating chemical at considerable continuous operating cost.

To solve the aforementioned problem in handling dilatant sludges, this invention introduces a new concept in producing a novel method and means for reducing the resistance to slip or flow between the solids being raked and the subjacent layer of residual solids on the tank bottom.

According to this novel concept, means are provided for introducing dilating water directly at or near the aforementioned zones of shear, so that the water does not have to penetrate any substantial distance through a bed of settled or packed solids.

The invention therefore aims to provide means for causing sludge or dilating supernatant water to be channeled downwardly to the point or area of interface or slip between the mass of solids being moved and the residual layer underneath.

For that purpose, the mass of settled solids instead of being shoved directly against the aforementioned resistance, is cut or sliced and lifted from the subjacent layer, thereby causing dilating thin sludge or supernatant to enter by way of a low resistance path into the area of the interface.

According to one embodiment, the foregoing objective is attainable by means of a rotary rake structure provided with specially shaped raking blades.

In this embodiment, the standard vertically straight sludge shoving blades are replaced with blades of scoop-shaped configuration. In vertical section the contour comprises a vertical straight upper portion merging downwardly with a forwardly curved or scooped lower portion terminating in a forwardly directed rigid leading edge effective to produce the horizontally directed cutting or slicing effect.

The leading slicing edge thus cuts and lifts settled solids away from the subjacent layer of residual material, while permitting access of thin sludge or supernatant liquid from an upper zone to the aforementioned interface between the moving solids and the bottom layer with the concurrent dilating and flow promoting effect upon the sludge.

For that purpose, the upper or shoving part of the blade may be such as to extend above the layer of settled packed solids, or at least up into a zone or more fluid pulp, thus affording a wide channel in back of the blade for the dilating water to reach the interface or point of separation at the cutting edge. The spacing of the blades along the rake arm is such that solids pushed by one blade are not caused to fill the space or flow channel behind the inwardly adjacent blade, thus leaving the channel free for admitting fluid pulp into the zone of separation by the cutting edge.

Where the height of the blade itself is limited for structural reasons, channel elements may be affixed to the trailing side of the contoured blades, reaching upwardly far enough to establish flow channels for thin sludge or dilating water from a superjacent zone. Also, the addition of such flow channel elements may facilitate the conversion of an existing rake structure when replacing the conventional straight vertical blades with the newly contoured scoop shaped blades.

But even pulps or sludges of a flocculent nature will benefit from this invention. Such is the case where the amount of the "yield value" of a flocculant pulp will affect the sludge raking operation with respect to torque requirements. In such sludges, the particles cohere into a plastic structure which resists displacement. However, the yield value of such a sludge is highly dependent upon dilution, decreasing very rapidly with the introduction of diluting water.

In the case of such flocculent sludges it is common practice to run the rake arms submerged in a deep layer of thickening pulp.

With this invention, dilating water may be introduced or channeled into the bottom zone of the sludge bed, thereby reducing the drive torque requirement.

Further significance is attached to this invention insofar as it can also be applied in a manner to greatly relieve an additional substantial torque load imposed by the central sludge accumulation upon the scraper blades operating in the annular sump around the center pier.

According to another embodiment, the vertically straight standard raking blades may be left unchanged due to the provision of supplemental transverse blades connected to the standard raking blades in such a manner that liquid is channelled to the raking blades through downflow ducts provided on the supplemental means.

Specific features are found in various structural forms of the invention.

Other features and advantages will hereinafter appear.

FIG. 4 is a detail plan view taken from FIG. 3, of one of a first group of vertically as well as transversely curved raking blades provided additionally with vertical duct members for sludge dilating liquid.

FIG. 5 is a vertical-sectional view taken on line 5–5 of FIG. 4.

FIG. 6 is a detail plan view taken from FIG. 3, of one of a second group of vertically curved raking blades provided additionally with vertical duct members for sludge dilating liquid.

FIG. 7 is a cross-sectional view taken on line 7—7 of FIG. 6.

FIG. 8 is a detail plan view taken from FIG. 3, of one of a third group of plain raking blades.

FIG. 9 is a cross-sectional view taken on line 9—9 in FIG. 8.

FIG. 10 illustrates the sludge dilating function of the vertically curved raking blades in a sludge bed of greater depth.

FIG. 11 illustrates the sludge dilating function of the vertically curved raking blades in a sludge bed of lesser depth;

FIG. 12 is a cross-sectional view of the central part of the rake structure taken on line 12—12 in FIG. 1, provided with vertically curved blades operating in the annular sludge collecting sump.

FIG. 14 is a part sectional detail rear view of one of the curved blades taken from FIG. 13, provided with vertical sludge delating duct.

FIG. 15 is one part sectional end view of the curved blade taken on line 15—15 in FIG. 14.

FIG. 16 is the opposite end view of the curved blade, taken on line 16—16 in FIG. 14, with parts broken away.

FIG. 18 is a rear view of a curved blade similar to FIG. 14, provided with a modified vertical sludge dilating duct.

FIG. 19 is a vertical sectional view of the curved blade taken on line 19—19 in FIG. 18.

FIG. 20 is a top view of the curved blade taken on line 20—20 in FIG. 18.

FIG. 21 is a plan view of one of the rake arms showing another embodiment of the invention, wherein a supplemental linear blade extending transversely of the standard raking blades, provides the supply of dilatant liquid through downflow ducts rising from the supplemental blade.

FIG. 22 is a part sectional view taken on line 22—22 in FIG. 21, showing the attachment of the supplemental linear blade to the underside of the raking blades.

FIG. 23 is another partial cross-sectional view taken on line 23—23 in FIG. 21, showing the transverse linear supplemental blade divided into individual sections extending between respective pairs of raking blades.

FIG. 24 is a plan view of the rake arm similar to FIG. 21, showing individual transverse supplemental blades in staggered arrangement, each with a downflow duct for supplying dilative liquid to the respective associated raking blades.

FIG. 25 is a part sectional view taken on line 25—25 in FIG. 24.

Figure 1:
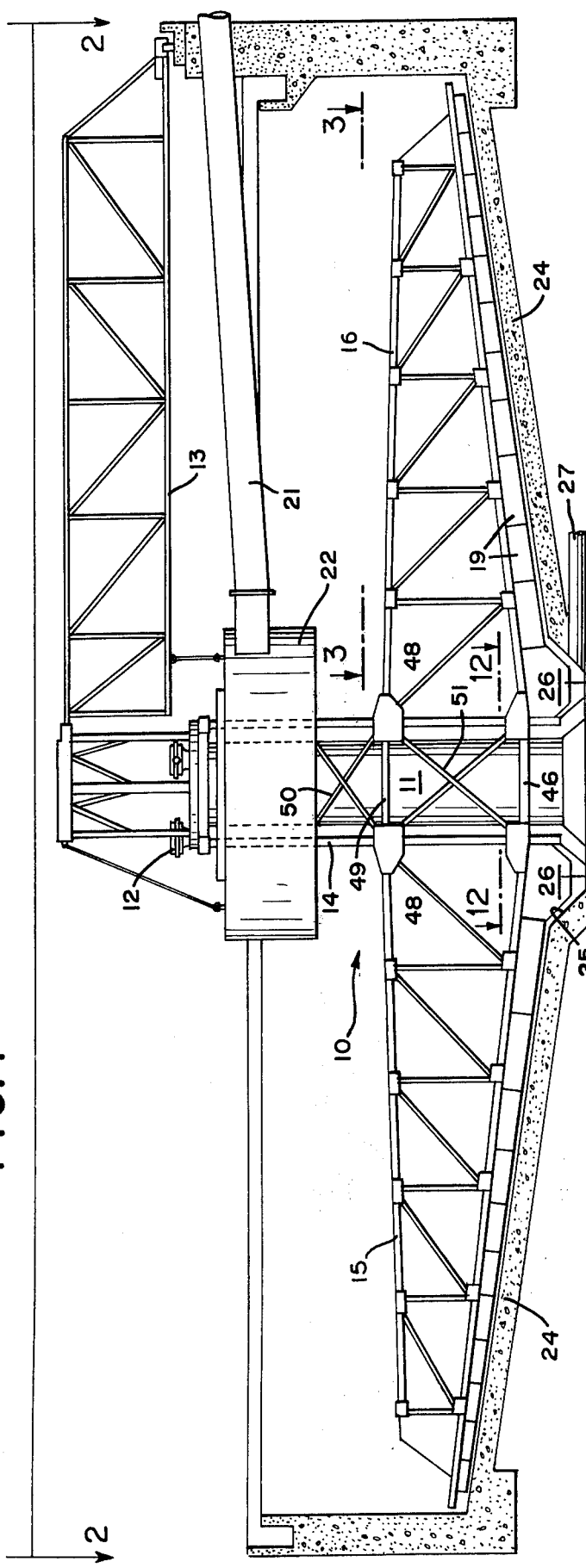
FIG. 1 is a vertical sectional view of a sedimentation tank having a center pier supported rotating sludge raking structure embodying the invention featuring vertically curved raking blades.
Figure 2:
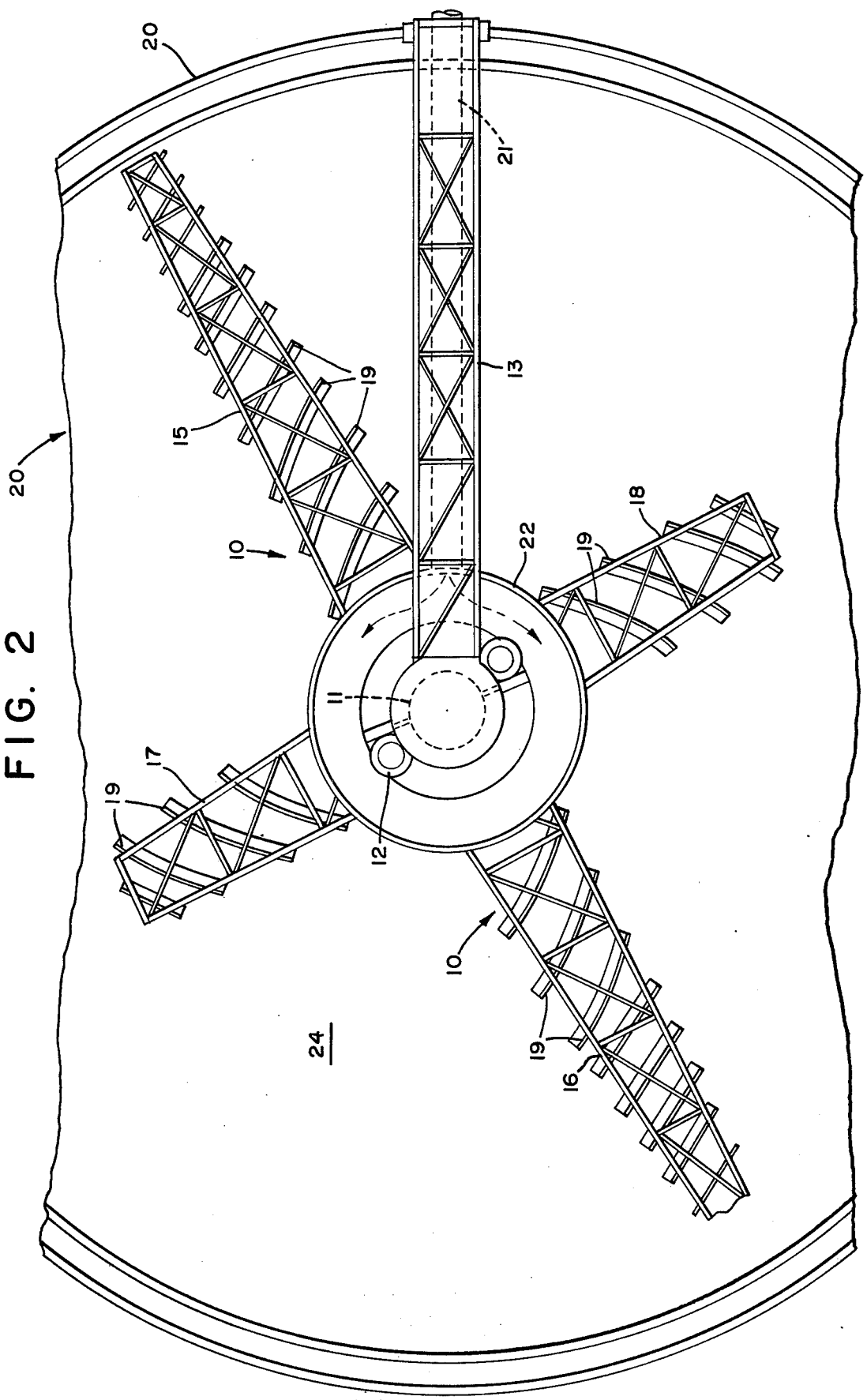
FIG. 2 is a plan view of the sedimentation tank, taken on line 2–2 in FIG. 1, showing the arrangement of rake arms of the sludge raking structure.
Figure 13:
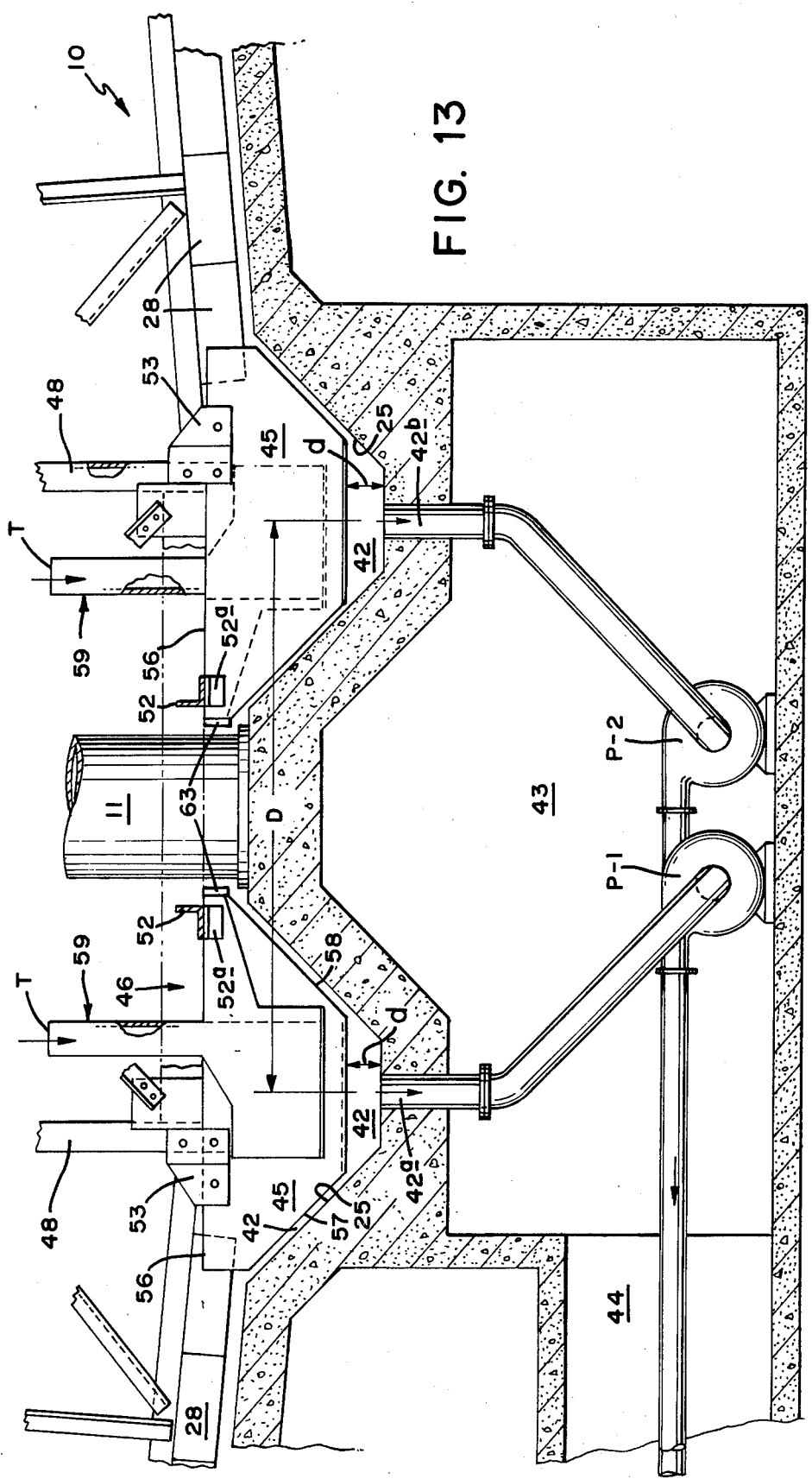
FIG. 13 is a enlarged vertical sectional view taken on line 13—13 in FIG. 12, further showing sludge withdrawal pumping facilities.
Figure 17:
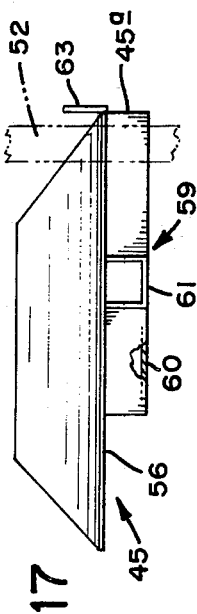
FIG. 17 is a top view of the curved blade, taken on line 17—17 in FIG. 14.

The invention as illustrated by way of example in FIGS. 1 and 2, is embodied in a continuously operating thickening tank of the type wherein a sludge raking structure 10 is supported for rotation upon a center pier 11. A drive mechanism 12 of any suitable known construction, is mounted atop the pier providing the driving torque for the rake structure. The pier also supports the inner end of an access bridge 13.

The rake structure comprises a central vertical cage portion or cage 14 surrounding the pier, and rake arms of girder like construction extending rigidly from the cage. As shown in this example, the rake structure has one pair of long rake arms 15 and 16 opposite to one another, and a pair of short rake arms 17 and 18 disposed at right angles thereto, all arms having sludge impelling or conveying blades 19 fixed to the underside thereof. In this general view of the thickening tank the blades are shown only diagrammatically, but since they embody the invention, their structural as well as functional features are clearly illustrated in the subsequent drawing figures.

The rake structure operates in a settling tank 20 to which a feed suspension or feed pulp is supplied through feed pipe 21 terminating in a feed well 22 which surrounds the top end portion of the rake structure, and is supported by the pier.

The tank itself may be of usual construction, comprising a bottom 24 of shallow inverted conical inclination, and formed with an annular sump 25 around the pier, to which settled solids or sludge are conveyed by the rake structure. Scraper blades 26 unitary with the rake structure and substantially conforming to the profile of the sump, move the collected sludge to a point of delivery from the sump, as by way of a discharge pipe 27.

Figure 3:
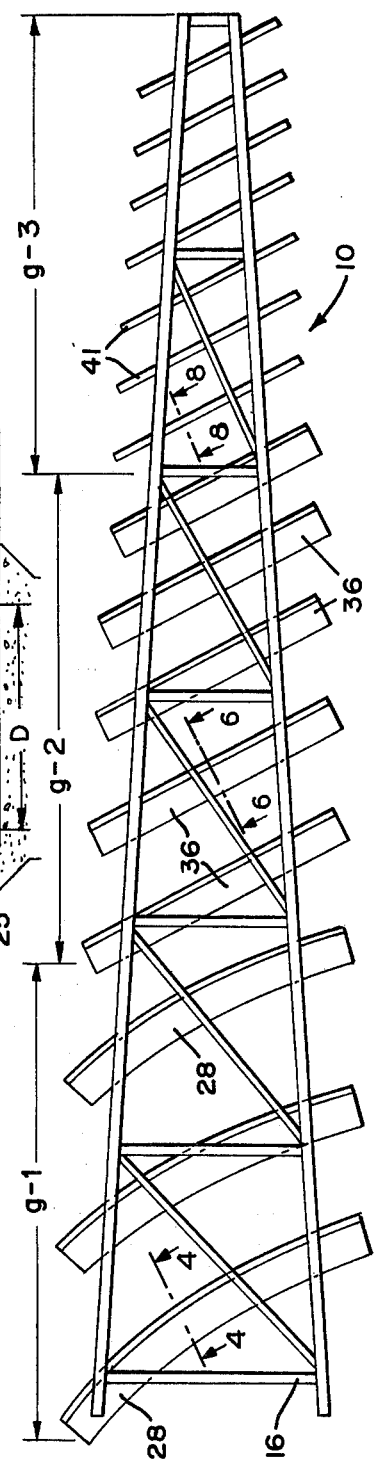
FIG. 3 is an enlarged detail plan view taken on line 3–3 in FIG. 1, of one of the rake arms provided with sequential groups of differently shaped raking blades embodying the invention.

FIG. 3 shows an enlarged plan view of one long rake arm 16, wherein are indicated sequential groups of raking blades namely an innermost Group G-1, an intermediate Group G-2, both embodying the invention, and an outer Group G-3 which may be of standard blade construction.

The sludge conveying blades embodying this invention will now be described by reference to the remaining drawing FIGS. 4 to 20.

The structural configuration of the blades 28 of the innermost Group G-1 is shown in detail FIGS. 4 and 5. These blades differ from those of the other groups, in that they are in the form of a shell or scoop of double or compound curvature presenting the sludge engaging surface.

Accordingly, the blades 28 comprise an upper portion 28a that is vertically straight, but horizontally arcuate in cross-section. Continuing from the lower arcuate end 29 of this upper portion and merging therewith, is a lower scoop-shaped portion 30. This lower portion therefore presents a compound curvature terminating in a substantially horizontal arcuate cutting edge 31. A pair of upright channel members 32 and 33 shown in the form of angle irons, are fixed or welded to the rear or trailing face of the arcuate upper portion, the angle or apex of these members pointing towards the center of the tank, that is in the direction of the effective radial component movement of the sludge being conveyed by the blade.

The blades 28 of group G-1 operate in the innermost annular area of the tank bottom where the sludge accumulation attains its maximum depth, as is schematically indicated in FIG. 10.

The compound sludge conveying and sludge dilating function of these blades is such that the phenomenon of suction that becomes effective underneath the scoop-shaped lower portion of the blade, will cause thinner sludge from a higher zone to flow down the backside of the blade, as indicated by flow arrows A-1.

Dilation of the sludge is thus induced around the blade, increasing the flowability of the sludge along with the attendent saving due to a reduction in driving torque.

A vertical sludge pushing surface "S" (see FIG. 10) is presented by the upper straight portion 28a (see FIG. 5) of the blade.

With the leading edge 31 slicing into the accumulation of settled solids, the lower scoop-shaped portion 30 of the blade is effective to lift this material 34 off the residual thin layer 35. This causes downward movement or suction of thin sludge, or else of supernatant, from an upper zone into the space below the curved or scoop shaped portion 30, thereby effecting dilation of the packed sludge solids in the immediate vicinity and around the blade incident to conveyance of the sludge.

However, in the case of a deep sludge bed, the sludge dilating effect may be augmented or intensified by the provision upon the backside of the blade of the aforementioned vertical channel members 32 and 33. These members may extend upwardly far enough to induce downflow of thin sludge or else of supernatant. These channel members may assume structural forms other than the one shown, for instance other channel profiles, or else pipes or ducts.

The blades 36 of the second Group G-2 (see FIG. 3) as shown in FIGS. 6 and 7, differ from those in the first group G-1 insofar as the upper portion of the blade is represented by a vertically straight plate 37 formed without curvature, and having a straight horizontal bottom edge portion 38. Connected to, or merging with this lower edge portion of the plate is a scoop-shaped lower portion 39 formed with a single vertical curvature and thus presenting an horizontal leading cutting edge 40. These blades operate over an intermediate annular part of the tank bottom where the sludge bed is of intermediate or moderate height as tentatively illustrated in FIG. 11.

The compound sludge conveying and sludge dilating function of these intermediate blades is similar in principle to that of blades 28, of Group G-1, while allowing for a more copious downflow of dilating water to the underside of the scoop-shaped portion, and thus to the forward cutting edge of the blade. However, a pair of vertical channel members 40a and 40b are also shown, similar to those of the blades in FIGS. 4 and 5 operating in the inner zone.

The blades 41 of the third Group G-3 may be of vertically planar standard type as shown in detail FIGS. 8 and 9, inasmuch as they operate in the outer annular area of the tank bottom where the layer of the settled solids is only very thin.

According to this invention, it was furthermore found, especially in dealing with the aforementioned dilatant type of sludges, that a substantial proportion of the driving torque was consumed by the scraper blades that must shove the sludge accummulation in the annular sump to a point of withdrawal. It was found that this represented a substantial proportion of the torque load in spite of the relatively small median diameter "D" of the annular sump (see FIGS. 1 and 13). It was then theorized that the resistance thus imposed upon the scrapers was due to the fact that the sludge was confined within the sump and that a torque consuming head-on push by the scrapers was required to overcome that resistance in order to move the thus laterally confined mass to a point of discharge.

However, according to the invention, that part of the torque requirement consumed by the action of the scrapers in the trench, is also reducible significantly by applying the above stated principle of the invention relative to sludge dilatancy. A suitable scraper construction for that purpose is exemplified in the enlarged fragmentary views of the settling tank in FIGS. 12 and 13 and the related figures 14 to 20.

In a practical embodiment (see FIG. 13) the annular sump or sludge collecting trench 42 has a plurality of bottom discharge outlets uniformly spaced apart, and connected downwardly to respective pumps. By way of example, two pumps P-1 and P-2, are shown, although three pumps may be perferable in order to reduce the sludge mass that must be shoved by each scraper to the respective discharge points in the sump.

The pumps P-1 and P-2 are contained in an operating chamber 43 of concrete construction located underneath the central portion of the tank bottom, and accessible through a tunnel 44.

In this embodiment (see FIGS. 12 and 13), four radially extending scrapers 45 are located at the respective four corners of the central vertical cage portion of the rake structure, fixed to the underside thereof. The cage portion resembles a vertical box structure of square cross-sectional configuration, comprising an horizontal bottom frame 46 composed of four structural members 47, and a corresponding frame at the top (not visible in FIG. 1, both top and bottom frames being interconnected by vertical corner members 48. In FIG. 1 suitable transverse bracing members 49 as well as diagonal bracing 50 and 51 (see FIG. 1) in the sides complete this vertical cage portion of the rake structure.

For support of the scrapers 45 at the underside of the cage portion, or bottom frame 46 there are provided inside the bottom frame 46 and as part thereof, four horizontal brace members 52 transversing the respective corners of the frame (see FIG. 12). The inner ends 45a of the scrapers of the scrapers (see FIG. 14) are fixed to the underside of respective corner brace members 52, as indicated by angular clips 52a (see FIGS. 14 and 15). A vertical angular gusset plate 53 (see FIGS. 12, 13, and 14) rigidly connects the outer end portion of each scraper 45 to the foot end of the respective adjoining vertical corner member 48 of cage portion 14.

The scraper 45 itself, according to one embodiment, comprises a radially extending plate 54 having a forwardly curved scoop-shaped lower end portion 55 which may terminate a distance "d" (see FIG. 13) from the bottom of the annular trench.

This scraper plate 54 as shown, has a transverse top edge 56 and downwardly converging side edges 57 and 58 conforming to the profile of the annular trench.

A vertical duct structure 59 open at the top "T" and at the bottom "B" is welded to the back side of the scraper plate, with the lower end of the duct conforming partially to the curved portion 55 of the scraper plate (see FIGS. 15 and 16). This duct structure comprises a wide flat box like lower end portion 60 hugging the backside of the scraper plate, and a narrower stack like upper end portion 61 extending upward beyond the top edge of the scraper plate. This duct thus rises to a point sufficiently high for thin sludge or supernatant to pass through the duct down to the underside of the curved lower end portion of the scraper plate, thereby producing the sludge dilating and torque load reducing effect described above.

In the embodiment according to (FIGS. 18 to 20) of scraper blades 62 in the trench, the duct of the preceding embodiment is replaced by a rearwardly open vertical channel member 62a.

An auxiliary clean-out scraper plate 63 is fixed to the inner end of scraper plate 54 at right angles to the vertical plane thereof, and effective adjacent to the foot end of the center pier.

For the purpose of reducing the torque load on an existing rake structure equipped with the standard raking blades, and consequently easing the load on the drive mechanism, the rake structure is convertible by utilizing the teaching of this invention. Such conversion can be effected by replacing the existing raking blades with others which are contoured or scoop shaped or curved in the manner set forth above embodying the invention. According to another mode of conversion, the lower portion of the standard raking blades is cut away, and scoop shaped end portions are substituted, so that the thus converted blades will meet the requirements of the invention, substantially in a manner indicated in FIGS. 4, 5, 6, 7, 11 and 12.

The invention is not limited to the example of the center pier supported rigid rake structure herein shown. Another embodiment is found for instance in the settling tank and non-rigid rake structure shown in the patent to Klopper, U.S. Pat. No. 3,295,835. This rake structure is non-rigid by comparison, in the sense that a double hinge device connects a tubular rake arm with the lower end of a vertical shaft or member rotated by the drive mechanism. A drive arm located above or near the liquid overflow level is fixed to the shaft, and has a drag connection with the rake arm, so that rotation of the shaft together with the drive arm will drag the rake arm over the tank bottom, conveying the sludge to the central outlet zone. The double hinge device and the drag connection allow the rake arm to override excessive sludge accummulations even while continuing the conveyance of the sludge.

In a laboratory scale set-up the invention may be substantiated by tests whereby the torque load reactions from differently shaped raking blades are comparatively measurable for different sludges.

Simulating large scale conditions, such comparative tests corroborating the invention, will yield information regarding the torque resistance of the standard raking blades vs. the resistance of blades that are curved or scoop shaped in accordance with the invention.

Following are the results of such comparative tests taken on an Itabirite iron ore sludge, and also on a prepared sludge of potatoe starch, both sludges exhibiting the above described dilatancy characteristics. As seen from the test data below, the Itabirite sludge when left with the particles in their original magnetic state, presents a substantially greater resistance than it does after it has been subjected to demagnetizing treatment.

The following test results are comparative as between the standard blades and the shaped or curved blades of the invention in terms of the measured torque load reaction:

| A. Itabirite Type Iron Ore (left in the magnetic state): | | |
| --- | --- | --- |
| | Standard Blade | Curve Blade |
| Torque Load Reaction in Grams | 230 | 110 |
| B. Itabirite type Iron Ore (demagnetized) | | |
| Torque Load Reaction in Grams | 70 | 30 |
| C. Potatoe Starch (300g/l not thickened) | | |
| Torque Load Reaction in Grams | 100 | 75 |

In the embodiment of FIGS. 21 and 22, a rake arm R-1 is equipped with standard or vertically straight raking blades 65.

However, for the purposes of this invention, a supplemental linear dilating blade 66 of the length "L" coextensive with the rake arm, is fixedly connected to the leading end portions 67 of the raking blades at the underside thereof, and thus in transverse relationship therewith.

The linear blade is sloped slightly about its longitudinal axis as indicated by the angle "A" (see FIG. 22). The slope of this blade is downward in the direction of motion of the rake arm, presenting a longitudinal leading slicing edge E-1 so that it would cut loose and lift a layer of settled solids just as they were entered by leading ends of the raking blades of the rake arm structure. At the same time, through downflow ducts 68 rising from this supplemental blade, thin sludge or supernatant from an upper zone is caused to pass down into and through the horizontal channel formed by the supplemental blade, supplying dilating liquid to an associated raking blade in the manner indicated by flow arrows A-2 in FIG. 21 and flow arrows A-3 in FIG. 22.

Also indicated in FIG. 21 is a modified arrangement, in that the length L of the linear blade is subdivided into individual aligned sections designated $a$-1 through $a$-8, each section being fitted in between, and fixed to a respective pair of associated raking blades 65. In this way (see FIG. 23), the lower or leading longitudinal edges E-2 of these blade sections may be on a level with the bottom edges of the raking blades.

According to another embodiment (see FIGS. 24 and 25), a rake arm R-2 differs from the one in FIGS. 21, 22, and 23, by a further modified supplemental blade arrangement.

In this arrangement, each of the respective raking blades 69 has fixed to the leading end thereof a supplemental blade extending substantially at right angles to the vertical plane of the raking blade, and thus at an angle "B" relative to the longitudinal extent of the rake arm proper. These individual supplemental blades designated $b$-1 through $b$-8, then present the staggered or stepped appearance in the plan view of FIG. 24.

Each of these supplemental blades has risen therefrom a downflow duct 70 through which dilating thin sludge or supernatant from an upper zone may pass into and through the horizontal channel formed by the supplemental blade, thus being supplied to the associated raking blade, in the manner indicated by flow arrows A-4 in FIG. 24 and flow arrows A-5 in FIG. 25.

In summary, this invention provides in conjunction with the operation of the raking blades, a method and means to cut and lift a layer of solids to be conveyed over the tank bottom by the raking blades, while permitting access of a more fluid pulp or supernatant fluid from a higher zone in the sedimentation pool to a space close to the zone where the cutting and lifting is taking place.

While the invention is herein illustrated and exemplified in an embodiment wherein the center pier supports the rake structure as well as the drive mechanism, the invention is equally applicable to what is generally termed a traction driven rake structure. As exemplified in prior art, the inner end of the rake arm is supported for rotation upon the center pier, but a self propelled drive mechanism is mounted upon the outer end of the rake arm for moving it along a peripheral supporting track or rail. Such a drive arrangement may comprise a self propelled roller device having a device support roller frictionally engaging the peripheral track.

Alternatively, non-frictional or positive drive means may be substituted, for instance cog wheel drive where the outer end of the rake arm is supported by an idler roller upon a peripheral track, but is propelled by a cog wheel of the drive mechanism, engaging a peripheral toothed rack.

I claim:

1. A continuously operating settling tank which comprises in combination slurry feeding means for the tank, overflow means for supernatant liquid, a tank bottom having a central sludge collecting zone provided with sludge discharge means, a rotary sludge raking structure and means for supporting said structure for rotation about a vertical axis, said raking structure comprising radial rake arms, a sequence of sludge raking blades fixed to the underside of at least one of said arms and spaced from one another along said arms, said blades being set at an angle to the direction of their path of movement so that sludge is conveyed by said blades to said collecting zone incident to rotation of the rake structure, said spaced blades on each arm comprising a group of inner blades operating in an inner zone adjacent to and surrounding said central sludge collecting zone, each of said inner blades having a substantially vertical upper body portion, a forwardly extending lower end portion shaped so as to present a rigid forwardly directed slicing edge, adapted to provide a forward lifting effect upon the sludge mass being engaged and moved by said blade, thereby inducing at the back side of said blade a downflow of liquid from a zone having a fluidity greater than that of the sludge mass being moved by the blade, into the space below said forwardly directed lower end portion, said downflow thus adapted to reach the interface between the sludge solids being moved by the blade and a bottom layer of residual material, whereby the frictional resistance of the sludge to the movement by the blades relative to said bottom layer is diminished;

and means for rotating the rake structure.

2. The settling tank according to claim 1, wherein at least one of said group of inner blades has fastened to the backside thereof at least one substantially vertical channel member extending upwardly beyond the top edge of the raking blade, constructed and arranged for inducing downward passage of said down flow therethrough.

3. The settling tank according to claim 1, wherein said rake structure comprises a vertical center cage portion, and rake arms extending rigidly from said center cage portion, wherein said support means comprise a center pier provided with means for supporting said rake structure for rotation through said cage portion surrounding said center pier, wherein said sludge collecting zone comprises an annular trench, and means for withdrawing collected sludge from said trench, and wherein said scraper blades are rigidly connected to said rake structure, constructed and arranged for moving the sludge in said trench to a point of withdrawal, said scraper blades in said trench being formed with a substantially vertical upper portion and a lower end portion of forwardly curved configuration such as to present a rigid slicing edge, said curved portion being shaped so as to have a forward lifting effect upon the sludge mass being engaged and moved by said blade, said lifting effect inducing a downflow from a zone having a fluidity greater than that of the sludge mass being moved by the blade, along the back side of the blade, whereby the resistance of the sludge to the movement of the blade is diminished.

4. The settling tank according to claim 1, wherein said rake structure comprises a vertical center cage portion, and rake arms extending rigidly from said center cage, wherein said support means comprise a center pier provided with means for supporting said rake structure through said cage portion for rotation, wherein said sludge collecting zone comprises an annular trench along with means for withdrawing collected sludge from said trench, and wherein scraper blades are rigidly connected to said rake structure, constructed and arranged for moving the sludge in said trench to a point of withdrawal, said scraper blades being formed with a lower end portion of forwardly curved configuration so as to present a forwardly directed slicing edge having a slicing and lifting effect upon the sludge mass being engaged and moved by said scraper blades, said scraper blades further having fixed to the backside thereof and extending upwardly therefrom a channel member constructed and arranged for inducing said flow to pass downwardly therethrough to the space below said curved lower end portion of the blades.

5. The settling tank according to claim 4, with the addition of a chamber located directly underneath the sludge collecting zone of the tank bottom, and having an access tunnel connected thereto and pump means situated in said chamber having at least one sludge withdrawal connection with said trench, and having sludge delivery conduit means extending outwardly through said tunnel.

6. A continuously operating settling tank which comprises in combination slurry feeding means for the tank, overflow means for supernatant liquid, a tank bottom having a central sludge collecting zone provided with sludge discharge means, a rotary sludge raking structure and means for supporting said structure for rotation about a vertical axis, said raking structure comprising radial rake arms, a sequence of sludge raking blades fixed to the underside of each of said arms, and spaced from one another along said arms, said blades being set at an angle to the direction of their path of movement so that sludge is conveyed by said blades to said collecting zone incident to rotation of the rake structure, said spaced blades on each arm comprising at least a group of inner blades operating in an inner zone adjacent to and surrounding said central sludge collecting zone, each of said inner blades having a substantially vertical upper body portion and a forwardly extending lower end portion shaped so as to present a rigid forwardly directed edge, said blade furthermore shaped so as to present a transverse concavity at the sludge engaging side thereof, corresponding to the rotary movement of the rake structure, said blade thus adapted to provide a forward lifting effect upon the sludge mass being engaged and moved by said blade, thereby inducing at the back side of said blade a downflow of liquid from a zone having a fluidity greater than that of the sludge mass being moved by the blade, whereby the resistance of the sludge to the movement of the blade is diminished, and means for rotating the rake structure.

7. The settling tank according to claim 6, wherein said spaced blades on each arm comprise an adjoining group of raking blades operating in a zone surrounding said inner zone, the blades of said adjoining group having a substantially vertical and substantially planar upper body portion and a forwardly extending lower end portion presenting a rigid forwardly directed slicing edge, said blade thus adapted to provide a forward lifting effect upon a sludge mass being engaged and moved by said blade, thereby inducing at the back side of said blade a downflow from a zone having a fluidity greater than that of the sludge mass being moved by the blades, whereby the resistance of the sludge to the movement of the blade is diminished.

8. The settling tank according to claim 7, wherein said spaced blades on each arm furthermore comprise an outer group of raking blades operating in a zone surrounding said adjoining zone, said outer blades having top and bottom edges defining between them a planar substantially vertical sludge engaging surface.

9. A continuously operating settling tank which comprises in combination slurry feeding means for the tank, overflow means for supernatant liquid, a center pier rising from the tank bottom with a sludge collecting zone comprising an annular trench surrounding the foot end of the pier, and provided with sludge withdrawal means, a rake structure having a central vertical cage structure surrounding the pier with means for supporting the rake structure for rotation on said pier, rake arms extending radially from said cage structure and rotating together therewith, said arms provided with a sequence of sludge raking blades spaced from one another along said arms, said blades being set at an angle to the direction of their path of movement so that sludge is conveyed to said collecting zone incident to rotation of the rake structure, a set of scraper blades fixed to the underside of said cage structure, and constructed and arranged for moving the sludge in said trench to a point of withdrawal, said scraper blades having a substantially vertical upper body portion and a lower end portion of forwardly curved configuration such as to present a rigid slicing edge, said curved portion being shaped so as to have a forward lifting effect upon the sludge mass being engaged and moved by said blade, said lifting effect inducing a downflow from a zone having a fluidity greater than that of the sludge mass being moved by the blade, along the back side of the blade and into a space below said curved portion, whereby the resistance of the sludge to the movement of the blade is decreased, and means for rotating the rake structure.

10. The settling tank according to claim 9, wherein said cage comprises a vertical box-shaped structure having a bottom frame of square configuration, and provided with horizontal corner brace members, wherein said scraper blades are located at the underside of said bottom frame, extending substantially radially at the respective corner portions thereof, and wherein means for fastening each said scraper blade to said frame comprises means for fixing the inner end portion of said scraper blade to a respective corner brace member, and means for fixing an intermediate portion of the scraper blade to the respective corner portion of the said bottom frame.

11. The settling tank according to claim 9, which in addition comprises a chamber located directly underneath said collecting zone of the tank bottom, and an access tunnel connected to said chamber, pump means located in said chamber, with sludge withdrawal conduit means connecting the bottom of said annular trench with said pump means, and sludge delivery conduits means leading from said pump means through said tunnel.

12. The settling tank according to claim 9, wherein at least one of said scraper blades is provided at the backside thereof with a conduit member constructed and arranged for inducing said flow to pass downwardly therethrough into the space below said curved bottom end portion of said scraper blade.

13. The settling tank according to claim 9, wheerein at least one of said arms is provided with an inner group of raking blades having a lower end portion shaped so as to present a forwardly directed slicing edge having a slicing and lifting effect upon the sludge mass engaged and moved by the respective blades.

14. The settling tank according to claim 9, wherein at least one of said arms is provided with an inner group of raking blades having a lower end portion shaped so as to prevent a forwardly directed slicing edge having a slicing and lifting effect upon the sludge mass engaged and moved by the respective blades, said blades in addition being formed to present a transverse concavity at the sludge engaging side thereof, and effective to move the sludge over a corresponding annular zone of the tank bottom to said collecting zone.

15. The settling tank according to claim 9, wherein said cage is in the form of a vertical box structure of square cross-sectional configuration, and said rake arms are of girder shaped construction extending rigidly from respective sides of said cage structure, and wherein at least one of said arms is provided with an inner group of raking blades having a lower end portion of forwardly curved configuration so as to present a forwardly directed slicing edge having a slicing and lifting effect upon the sludge mass engaged and moved by the respective blades, said blades in addition being shaped to present a transverse concavity at the sludge engaging side thereof, and adapted to move the sludge over a corresponding annular zone of the tank bottom to said collecting zone, and an outwardly adjoining group of raking blades having lower end portions shaped vertically similar to said inner group of raking blades, but formed so as to have a substantially planar vertical body portion, said adjoining group of blades being adapted to move the sludge over a corresponding annular zone of the tank bottom into said inner annular zone.

16. The settling tank according to claim 9, wherein said cage is in the form of a vertical box structure of square cross-sectional configuration, and said rake arms are of girder shaped construction extending rigidly from respective sides of said cage structure, and wherein at least one of said arms is provided with an inner group of raking blades having a lower end portion shaped so as to present a forwardly directed slicing edge having a slicing and lifting effect upon the sludge mass engaged and moved by the respective blades, said blades in addition being formed so as to present a transverse concavity at the sludge engaging side thereof, and adapted to move the sludge over a corresponding annular zone of the tank bottom to said collecting zone, said arms further provided with an intermediate group of raking blades having lower end portions shaped vertically similar to said inner group of raking blades, but formed so as to have a substantially planar vertical body portion, said intermediate group of blades being adapted to move the sludge over a corresponding annular zone of the tank bottom into said inner annular zone, and an outer group of raking blades having top and bottom edges defining between therein a vertically planar sludge engaging surface, said blades adopted to move the sludge over a corresponding outer annular zone of the tank bottom into said intermediate annular zone.

* * * * *